(12) United States Patent
Marabyan et al.

(10) Patent No.: US 10,145,071 B2
(45) Date of Patent: Dec. 4, 2018

(54) VEHICLE BARRIER SYSTEM

(71) Applicant: OneMarket Network LLC, San Francisco, CA (US)

(72) Inventors: Aram Marabyan, North Hollywood, CA (US); Juan Antonio Guerrero, Rancho Palos Verdes, CA (US)

(73) Assignee: Onemarket Network LLC, San Francisco, CA (US)

( * ) Notice: Subject to any disclaimer, the term of this patent is extended or adjusted under 35 U.S.C. 154(b) by 0 days.

(21) Appl. No.: 16/008,290

(22) Filed: Jun. 14, 2018

(65) Prior Publication Data

US 2018/0291574 A1    Oct. 11, 2018

Related U.S. Application Data

(60) Division of application No. 15/660,665, filed on Jul. 26, 2017, now Pat. No. 10,024,007, which is a
(Continued)

(51) Int. Cl.
| | |
|---|---|
| *E01F 13/06* | (2006.01) |
| *G08B 25/08* | (2006.01) |
| *G08B 5/36* | (2006.01) |
| *G06Q 20/04* | (2012.01) |
| *G08B 21/18* | (2006.01) |

(Continued)

(52) U.S. Cl.
CPC .............. *E01F 13/06* (2013.01); *E01F 13/10* (2013.01); *G06Q 20/045* (2013.01); *G07C 9/00896* (2013.01); *G08B 5/36* (2013.01); *G08B 21/18* (2013.01); *G08B 25/08* (2013.01);

(Continued)

(58) Field of Classification Search
CPC ........... E01F 13/06; E01F 13/10; E01F 13/00; E01F 13/123; E01F 13/04; G08B 21/18
See application file for complete search history.

(56) References Cited

U.S. PATENT DOCUMENTS

| | | |
|---|---|---|
| 3,794,966 A | 2/1974 | Platzman |
| 4,133,140 A | 1/1979 | Berard et al. |
| (Continued) | | |

FOREIGN PATENT DOCUMENTS

WO    8502698 A1    6/1985

OTHER PUBLICATIONS

"U.S. Appl. No. 14/852,323, Non Final Office Action dated Mar. 7, 2017", 12 pages.
(Continued)

*Primary Examiner* — Abigail A Risic
(74) *Attorney, Agent, or Firm* — Kwan & Olynick LLP (57) ABSTRACT

A vehicle barrier system and method that prevents "tailgating". The system may include a control system in communication with a sensor system for detecting a vehicle seeking passage through a gateway, as well as a first and second gate system. The control system receives data from the sensor system indicating the presence of the vehicle and, in response, determines whether the second gate system is closed. When the second gate is determined to be closed, the control system opens the first gate system to allow the vehicle to pass the first gate system and attempts to close the first gate system behind the vehicle after the vehicle passes the first gate system. In response to successfully closing the first gate system behind the vehicle, the second gate system is opened to allow the vehicle to proceed through the gateway. Otherwise, an alarm is sounded.

27 Claims, 5 Drawing Sheets

Related U.S. Application Data continuation of application No. 14/852,323, filed on Sep. 11, 2015, now Pat. No. 9,732,483.

(51) Int. Cl.
  *G07C 9/00* (2006.01)
  *E01F 13/10* (2006.01)
  *G07B 15/04* (2006.01)

(52) U.S. Cl.
  CPC ......... *G06Q 2240/00* (2013.01); *G07B 15/04* (2013.01); *G07C 2009/00928* (2013.01)

(56) References Cited

U.S. PATENT DOCUMENTS

| | | |
|---|---|---|
| 5,177,479 A | 1/1993 | Cotton |
| 5,323,151 A | 6/1994 | Parsadayan |
| 5,331,312 A | 7/1994 | Kudoh |
| 5,815,983 A | 10/1998 | Lodge |
| 5,872,525 A | 2/1999 | Fukasawa et al. |
| 5,884,432 A | 3/1999 | DeLillo |
| 6,267,332 B1 | 7/2001 | Almblad |
| 7,789,258 B1 | 9/2010 | Anderson |
| 7,856,915 B1 | 12/2010 | Anderson et al. |
| 8,223,010 B2 | 7/2012 | Petite et al. |
| 8,292,538 B2 | 10/2012 | Morgan et al. |
| 8,502,698 B2 | 8/2013 | Chen et al. |
| 8,641,352 B2 | 2/2014 | Stutz |
| 8,678,701 B1 | 3/2014 | Aldasem |
| 8,742,949 B2 | 6/2014 | Chang |
| 8,818,682 B1 | 8/2014 | Dolgov et al. |
| 8,831,970 B2 | 9/2014 | Weik, III et al. |
| 8,845,125 B1 | 9/2014 | Lumsden et al. |
| 8,869,448 B1 | 10/2014 | Lee |
| 8,960,536 B2 | 2/2015 | Wright |
| 8,985,890 B2 | 3/2015 | Miracle |
| 9,098,954 B1 | 8/2015 | Byrd |
| 9,732,483 B2 | 8/2017 | Marabyan et al. |
| 2003/0033388 A1 | 2/2003 | Hom et al. |
| 2005/0207616 A1 | 9/2005 | Brad et al. |
| 2006/0176171 A1 | 8/2006 | Fitzgibbon |
| 2010/0052947 A1 | 3/2010 | Lin et al. |
| 2012/0050069 A1 | 3/2012 | Mercier et al. |
| 2012/0092125 A1 | 4/2012 | Farber et al. |
| 2012/0143657 A1 | 6/2012 | Silberberg |
| 2013/0088324 A1 | 4/2013 | Morley |
| 2013/0132167 A1 | 5/2013 | Krug et al. |
| 2013/0176107 A1 | 7/2013 | Dumas et al. |
| 2013/0179238 A1 | 7/2013 | Warner, IV et al. |
| 2013/0209167 A1 | 8/2013 | Heald |
| 2013/0211628 A1 | 8/2013 | Thurow et al. |
| 2013/0211784 A1 | 8/2013 | Christianson et al. |
| 2013/0287491 A1 | 10/2013 | Petryshyn |
| 2013/0314232 A1 | 11/2013 | Jerhotova et al. |
| 2013/0317693 A1 | 11/2013 | Jefferies et al. |
| 2014/0241798 A1 | 8/2014 | Sharipov |
| 2014/0259930 A1 | 9/2014 | Gilliam |
| 2014/0266804 A1 | 9/2014 | Asadpour |
| 2014/0314480 A1 | 10/2014 | Heald |
| 2015/0016882 A1 | 1/2015 | Oakes et al. |
| 2015/0025947 A1 | 1/2015 | Dutta et al. |
| 2015/0130642 A1 | 5/2015 | Huang |
| 2015/0139726 A1 | 5/2015 | Burgin |
| 2015/0146001 A1 | 5/2015 | White |
| 2015/0217873 A1 | 8/2015 | Cox et al. |
| 2015/0254914 A1 | 9/2015 | Harucksteiner et al. |
| 2015/0281658 A1 | 10/2015 | Lee et al. |
| 2016/0343251 A1 | 11/2016 | Lee |
| 2017/0073912 A1 | 3/2017 | Marabyan et al. |
| 2017/0321385 A1 | 11/2017 | Marabyan et al. |

OTHER PUBLICATIONS

"U.S. Appl. No. 14/852,323, Notice of Allowance dated Apr. 12, 2017", 7 pages.

"U.S. Appl. No. 14/852,323, Restriction Requirement dated Nov. 29, 2016", 7 pages.

"U.S. Appl. No. 15/660,665, Examiner Interview Summary dated Oct. 3, 2017", 3 pages.

"U.S. Appl. No. 15/660,665, Non Final Office Action dated Sep. 20, 2017", 15 pgs.

"U.S. Appl. No. 15/660,665, Notice of Allowance dated Jan. 16, 2018", 7 pages.

VEHICLE BARRIER SYSTEM

CROSS-REFERENCE TO RELATED APPLICATIONS

This application is a divisional of U.S. application Ser. No. 15/660,665, filed 26 Jul. 2017 by Aram Marabyan et al., which is a continuation of U.S. application Ser. No. 14/852,323, filed 11 Sep. 2016 by Aram Marabyan et al., now U.S. Pat. No. 9,732,483. These applications are herein incorporated by reference for all purposes.

BACKGROUND

Recently, many paid garages have converted to fully automated facilities. Whereas in the past there were human attendants at every exit lane, full automation allows landlords to eliminate the human component by installing payment devices called Pay On Foot (POF) machines. Customers take a ticket upon entry, pay at a POF machine when leaving, insert the paid ticket into the exit terminal, and proceed to leave when the system recognizes the paid ticket and opens the gate arm. Full automation allows for an elimination of exit lane labor costs, reduced transaction times at exits, and elimination of mistakes or potential fraud.

Despite the benefits of a fully automated facility, certain problems exist when there is no human oversight at exit lanes. One problem that is increasingly common is for non-paying cars to follow a paying car into (or out of) the facility. This is referred to as "tailgating," and allows the tailgating cars) to avoid paying. Embodiments of the present disclosure address these and other issues.

SUMMARY

Embodiments of the present disclosure provide a vehicle barrier system that may be used to help prevent instances of "tailgating," where non-paying cars closely follow a paying car into (or out of) an automated garage facility or other venue to avoid fees. A vehicle barrier system according to us aspects of the present disclosure includes a control system in communication with a sensor system for detecting a vehicle seeking passage through a gateway, a first gate system, and a second gate system. The control system comprises a processor and memory coupled to the processor and storing instructions that, when executed by the processor, cause the control system to: receive data from the sensor system indicating the presence of the vehicle; in response to receiving the sensor data indicating the presence of the vehicle, determine whether the second gate system is closed; in response to determining that the second gate system is closed: open the first gate system to allow the vehicle to pass the first gate system; and attempt to close the first gate system behind the vehicle after the vehicle passes the first gate system; in response to successfully closing the first gate system behind the vehicle, opening the second gate system to allow the vehicle to proceed through the gateway; and in response to unsuccessfully closing the first gate system behind the vehicle, generating an alarm.

The present disclosure includes various methods, apparatuses (including computer systems) that perform such methods, and computer readable media containing instructions that, when executed by computing systems, cause the computing systems to perform such methods. Other features will be apparent from the accompanying drawings and from the detailed description which follows.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
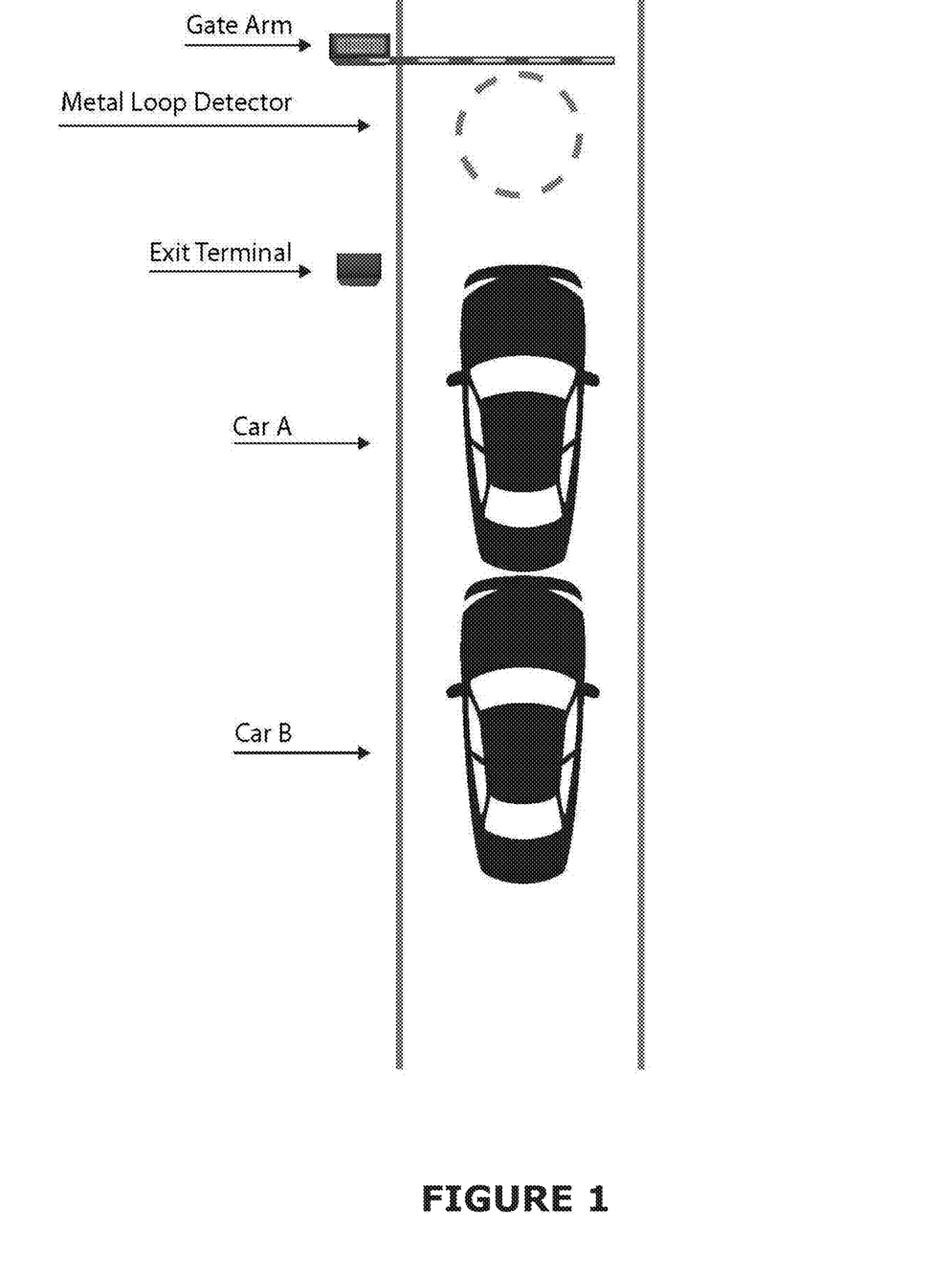
FIG. 1 illustrates an exemplary tailgating scenario.

FIG. 1 illustrates an example of "tailgating" at a conventional parking checkpoint. When the two cars (Car A and Car B) are close enough to each other, the sensor system (i.e., the Metal Loop Detector embedded under the pavement) prevents the Gate Arm from closing on Car B after the driver of Car A pays for parking at the Exit Terminal. Instead, the Gate Arm is left in the open (raised) position to prevent it from coming down on Car B and causing damage, thus allowing Car B to follow Car A under the Gate Arm without paying at the Exit Terminal. Additionally, there is typically a delay in gate arms coming down simply due to the mechanical speed of the equipment. Even if the Gate Arm started to lower to a closed position, if the Metal Loop Detector detects the presence of a vehicle (i.e., Car B) under the Gate Arm, the system will raise the Gate Arm back to open position, allowing Car B to exit without having to insert an unpaid ticket at the Exit Terminal.

Figure 2:
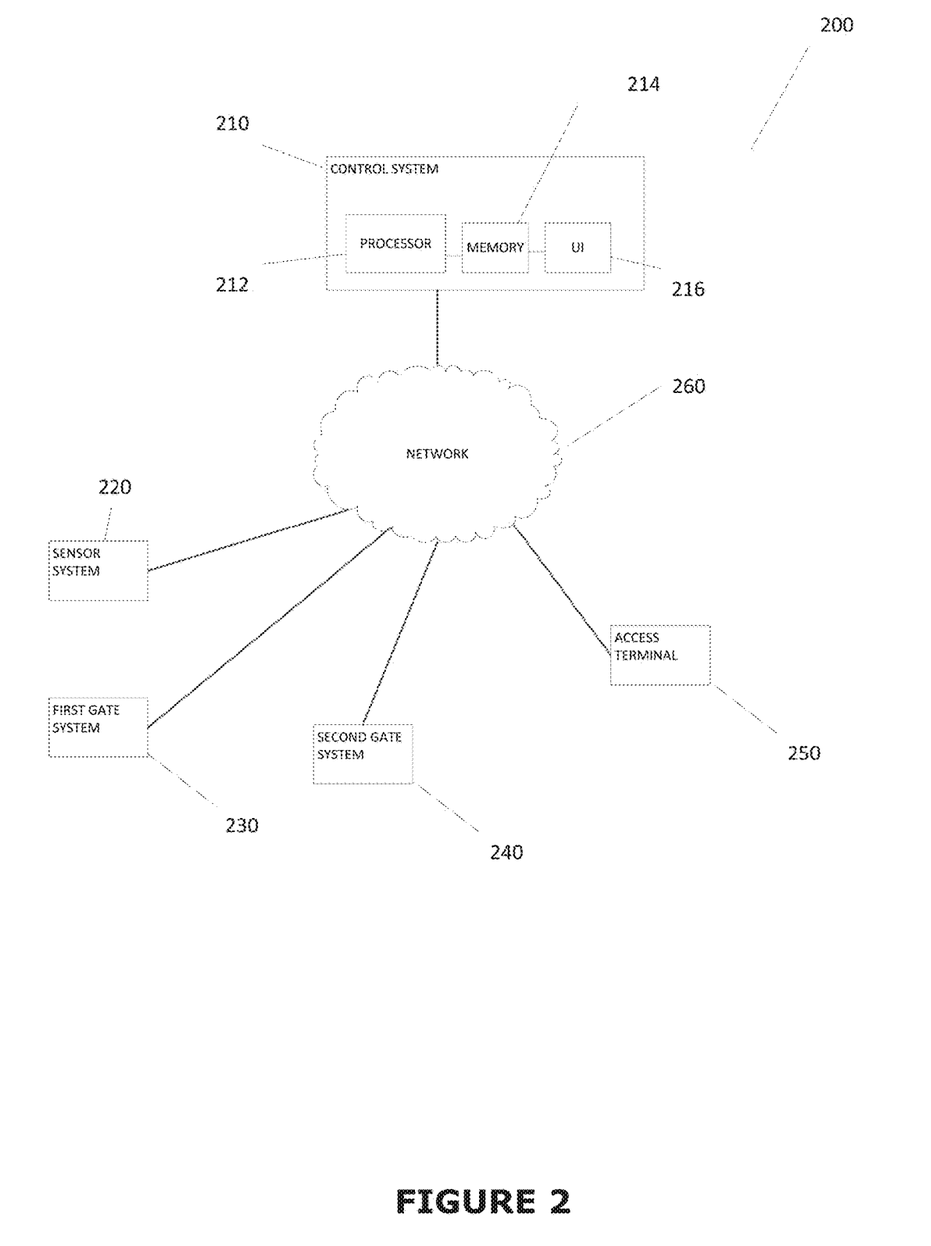
FIG. 2 depicts a block diagram of an exemplary system according to various aspects of the present disclosure.
Figure 3:
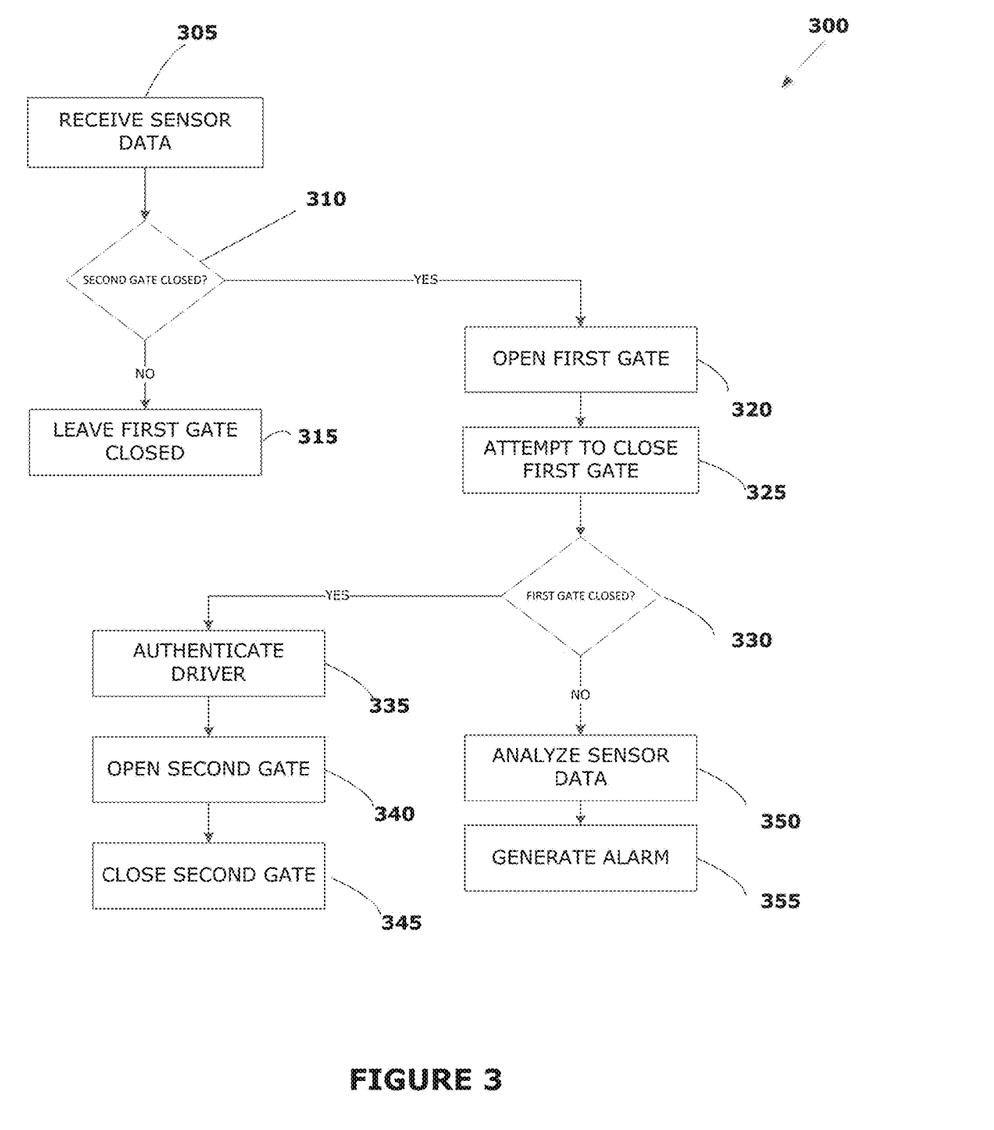
FIG. 3 illustrates an exemplary method according to various aspects of the present disclosure.
Figure 4A:
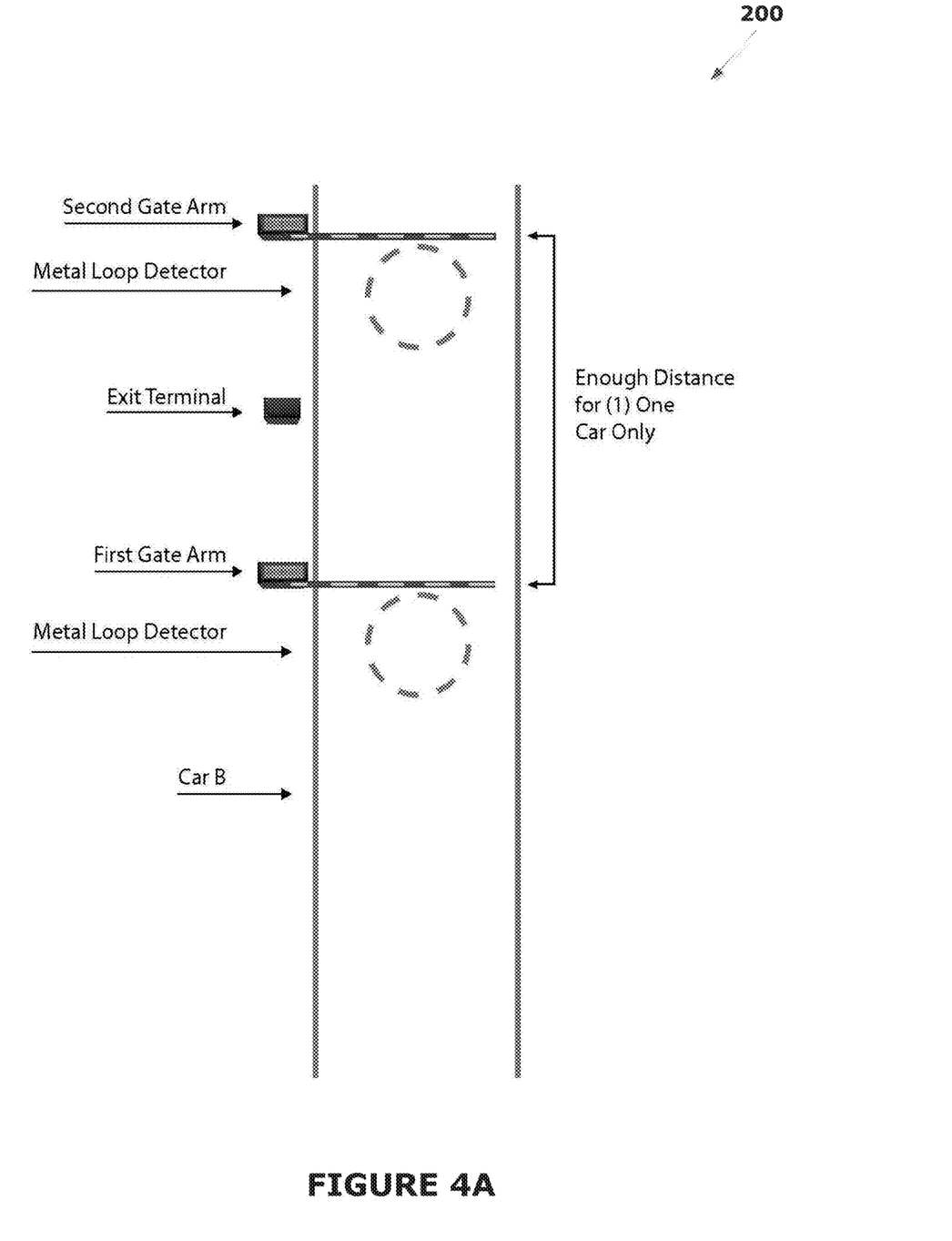
FIGS. 4A and 4B illustrate an overhead view of an exemplary embodiment of the system in FIG. 2 in operation.
Figure 4B:
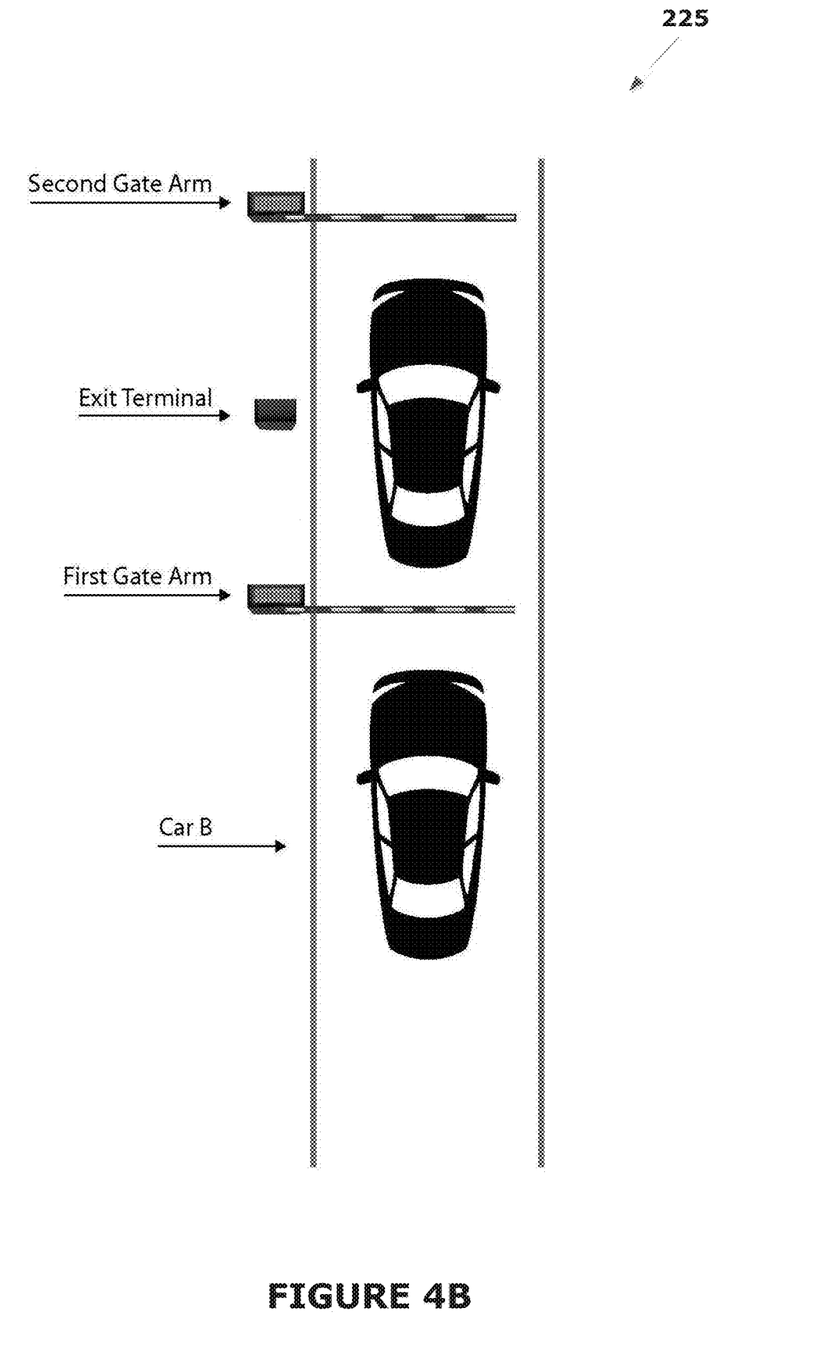

FIG. 2 is a block diagram of an exemplary vehicle barrier system for preventing tailgating according to aspects of the present disclosure, while FIG. 3 illustrates an exemplary method for preventing tailgating that may be practiced in conjunction with the system in FIG. 2. FIGS. 4A and 4B illustrate an exemplary embodiment of the system in FIG. 3 in operation. Embodiments of the present disclosure may be utilized to control access to or from a parking garage, parking lot, or other venue.

While FIG. 2 illustrates various components of a computer system, it is not intended to represent any particular architecture or manner of interconnecting the components. Other systems that have fewer or more components may also be used. In FIG. 2, the system 200 includes a control system 210 comprising a processor 212, memory 214, and user interface 216. Control system 210 may include any number of different processors, memory components, and user interface components, and may interact with any other desired systems and devices in conjunction with embodiments of the present disclosure.

The functionality of the control system 210, including the steps of method 300 from FIG. 3 described herein (in whole or in part), may be implemented through the processor 212 executing computer-readable instructions stored in the memory 214 of the control system 210. The memory 214 may store any computer-readable instructions and data, including software applications, applets, and embedded operating code. Portions of the functionality of the methods described herein may also be performed via software operating on one or more of the other components shown in FIG. 3, as well as using additional computing devices.

The functionality of the control system 210 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components.

In the example shown in FIG. 2, the processor 212 retrieves and executes instructions stored in the memory 214 to perform the functionality of the control system 210. Any type of processor, such as an integrated circuit microprocessor, microcontroller, and/or digital signal processor (DSP), can be used in conjunction with embodiments of the present disclosure. A memory 214 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 214 in any desired manner, such as in a relational database.

The control system 210 includes a user interface 216 that may include any number of input devices (not shown) to receive commands, data, and other suitable input. The user interface 216 may also include any number of output devices (not shown) to provides the user with data, notifications and alerts, and other information. Typical I/O devices may include mice, keyboards, modems, network interfaces, printers, scanners, video cameras and other devices.

The control system 210 may communicate with one or more computing devices, as well as other systems and devices in any desired manner, including via network 260. The control system 210 and/or other computing devices may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 260 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The exemplary vehicle barrier system 200 shown in FIG. 2 includes a sensor system 220 in communication with the control system 210. The sensor system 220 may include any number and type of different sensors to detect the presence of vehicles seeking passage through a gateway and to collect other data. Such sensors may include: a camera, a motion sensor, a pressure sensor, and an inductive loop sensor. In the exemplary embodiment of the system 200 shown in FIG. 4A, the sensor system 220 includes a pair of inductive loop sensors (each labeled "Metal Loop Detector"), with each loop sensor positioned in front of the two gate arms to detect the presence of a vehicle.

System 200 further includes a pair of gate systems, first gate system 230 and second gate system 240. The first gate system 230 is positioned to control access to an initial portion of a gateway, while the second gate system is 240 is positioned subsequent to the first gate system 240 to control final access to the gateway. As shown in FIG. 4A, for example, a vehicle first must pass the first gate system 230 (labeled "First Gate Arm") before passing the second gate system 240 (labeled "Second Gate Arm").

The Gate Systems 230, 240 may include any number and type of different doors, gates, and other systems for controlling access to a gateway. For example, Gate Systems 230, 240 may comprise one or more of: a horizontally tilting door, a vertically tilting door, a sectional door, a vertically rotating arm, horizontally rotating arm, a spike barrier, and a post. The first gate system 230 and second gate system 240 need not utilize the same type of access control system. In the example shown in FIG. 4A, the first gate system 230 and second gate system 240 each include a vertically rotating arm that lowers (closes) to block access to the gateway and raises (opens) to allow a vehicle to pass.

In the example shown in FIG. 2, the Control System 210 is in communication with an Access Terminal 250 adapted to receive input from a driver of a vehicle. The Access Terminal 250 may be positioned in any desired location, such as next to the first gate system 230 or (as shown for the "Exit Terminal" in FIG. 4A) next to the second gate system 240. Alternate embodiments may utilize multiple access terminals as well. In some embodiments, Access Terminal 250 may be adapted to communicate automatically with one or more systems and/or devices associated with a vehicle without input from the driver. For example, the Access Terminal 250 may communicate with a radio frequency identification (RFID) system coupled to a vehicle to automatically authenticate the vehicle for passage through the gateway. A user may also provide input to the Access Terminal 250 by scanning an RFID badge, inserting a validation ticket, entering a code, scanning a barcode, and/or entering biometric information.

The Control System 210 may be adapted to analyze the information collected from the user (or automatically from a system associated with the user's vehicle) by the Access Terminal 250 to authenticate the user or vehicle for passage through the gateway. Successful authentication in this manner may be required prior to opening one or both of the first gate system 230 or the second gate system 240.

FIG. 3 illustrates an exemplary method 300 that may be performed in conjunction with the system 200 shown in FIG. 2. In this exemplary method, the control system 210 receives data (305) from the sensor system 220 that indicates the presence of a vehicle seeking access through a gateway controlled by the first gate system 230 and second gate system 240. In response to receiving the sensor data, the control system 210 determines whether the second gate system 240 is closed (310). If the second gate system 240 is not closed (i.e., a vehicle could drive through the second gate system 240) the control system 210 leaves the First Gate closed (315), which prevents multiple vehicles from tailgating past both the first gate system 230 and second gate system 240 as soon as the first gate system 230 is opened.

If the control system 210 determines that the second gate system 240 is closed, the control system 210 opens (320) the first gate system 230 to allow the vehicle to pass the first gate system 230. The control system 210 attempts to close (325) the first gate system 230 behind the vehicle after the vehicle passes the first gate system 230.

The control system 210 determines whether the first gate system 230 successfully closed behind the vehicle (330). If the first gate system 230 successfully closed behind the vehicle, the vehicle will be positioned between the first gate system 230 and the second gate system 240 (both off which are closed) as shown for the lead car in FIG. 4B. Any vehicles behind the lead vehicle (i.e., "Car B" in FIG. 4A) will be behind the first gate system 230. In response to successfully closing the first gate system 230 behind the vehicle, the control system 210 authenticates the driver (or vehicle itself) (335) as described above. In response to a successful authentication, the control system 210 opens (340) the second gate system 240 to allow the vehicle to pass through the gateway, and closes (345) the second gate system 240 behind the vehicle.

In the event that the first gate system 230 did not close successfully, the control system may analyze (350) data from the sensor system 220 and generate an alarm (355). In The control system 210 may generate a variety of different alarms, such as visual alarms, audio alarms, and alarms included in electronic communications such as emails, SMS texts, and the like.

In order prevent damage to longer vehicles, vehicles with trailers, or even a second vehicle attempting to tailgate behind a first vehicle, the control system 210 may refrain from closing either gate system 230, 240 in response to detecting an obstacle within a gate system. The control system may automatically analyze (350) sensor data to identify the nature of an obstacle. For example, in some embodiments the sensor system 220 may include one or more cameras positioned and adapted to capture an image (as well as video) of an obstacle blocking either gate system 230, 240. The control system 210 may then automatically identify the obstacle using, for example, an image recognition algorithm, and then generate the alarm (355) based on the identification of the obstacle.

For example, the subject matter and delivery of an alarm may be customized based on whether the obstacle is a person, animal, part of a vehicle, another vehicle, etc. Consider an example where the obstacle is identified to be a second vehicle, the control system 210 may automatically determine that a vehicle is attempting to tailgate, and generate the alarm (355) to alert a user of the system 200 (such as a parking attendant) to attend to the gateway and enforce payment from the tailgating vehicle. The alarm could also (or alternatively) be delivered to the driver of the tailgating vehicle to instruct the driver of the second vehicle to back up to allow the first gate system 230 to close. Alarms could also be generated and delivered to a law enforcement agency, as well as any other party.

In embodiments employing one or more cameras in conjunction with the sensor system 220, such cameras may be adapted to capture images of the drivers of vehicles attempting to pass through the gateway, as well as license plates coupled to such vehicles. The control system 210 may use image recognition algorithms or other techniques to determine whether a driver's face and/or license plate is obscured from the view of the cameras. For example, a license plate may be covered in mud, or the driver may intentionally be hiding his/her face. In such cases, an alarm may include a notification directed to the driver of a vehicle to remove the obfuscation to allow identification of the vehicle and/or driver.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method for a vehicle barrier system, the method comprising:
   receiving, by a control system, data from a sensor system indicating the presence of a vehicle at a gateway, wherein the control system is in communication with the sensor system, a first gate system, and a second gate system that is subsequent to the first gate system;
   in response to receiving the sensor data indicating the presence of the vehicle, determining, by the control system, whether the second gate system is closed;
   in response to determining, by the control system, that the second gate system is closed:
      opening, by the control system, the first gate system to allow the vehicle to pass the first gate system; and
      attempting, by the control system, to close the first gate system behind the vehicle after the vehicle passes the first gate system;
   in response to successfully closing the first gate system behind the vehicle, opening, by the control system, the second gate system to allow the vehicle to proceed through the gateway; and
   in response to unsuccessfully closing the first gate system behind the vehicle, generating an alarm by the control system.

2. The method of claim 1, further comprising:
   receiving input from a driver of the vehicle; and
   successfully authenticating the driver, based on the input from driver, prior to opening the second gate system.

3. The method of claim 2, wherein the input from the driver includes one or more of: insertion of a validation ticket, entry of a code, scanning of a barcode, scanning of a radio frequency identification badge, and entry of biometric information.

4. The method of claim 2, wherein the sensor system includes one or more of: a camera, a motion sensor, a pressure sensor, and an inductive loop sensor.

5. The method of claim 1, wherein the first gate system comprises one or more of: a horizontally tilting door, a vertically tilting door, a sectional door, a vertically rotating arm, horizontally rotating arm, a spike barrier, and a post.

6. The method of claim 1, wherein the second gate system comprises one or more of a horizontally tilting door, a vertically tilting door, a sectional door, a vertically rotating arm, horizontally rotating arm, a spike barrier, and a post.

7. The method of claim 1, wherein generating the alarm includes generating one or more of: a visual alarm, an audio alarm, and an electronic communication.

8. The method of claim 1, wherein the sensor system is adapted to detect an obstacle blocking closure of the first gate system, and the method further comprises causing the control system to refrain from closing the first gate system in response to detection of the obstacle by the sensor system.

9. The method of claim 8, wherein the sensor system includes one or more cameras adapted to capture an image of the obstacle blocking the first gate system.

10. The method of claim 9, further comprising causing the control system to:
    automatically identify the obstacle from the image of the obstacle; and
    generate the alarm based on the identification of the obstacle.

11. The method of claim 10, wherein the obstacle is a second vehicle, and the method further comprising causing the control system to:
    automatically identify the second vehicle from the image of the obstacle; and
    based on identifying the second vehicle, generate the alarm to a user of the system to attend to the gateway.

12. The method of claim 11, wherein the obstacle is a second vehicle, and the method further comprising causing the control system to:
    automatically identify the second vehicle from the image of the obstacle; and
    based on identifying the second vehicle, generate the alarm to instruct a driver of the second vehicle to back up to allow the first gate system to close.

13. The method of claim 9, wherein the obstacle is a second vehicle, and wherein the one or more cameras are adapted to capture one or more of: an image of a driver of the vehicle, an image of a driver of the second vehicle, an image of a license plate coupled to the vehicle, and an image of a license plate coupled to the second vehicle.

14. The method of claim 13, further comprising causing the control system to:
   determine, based on an image captured from the one or more cameras, that a license plate coupled to the vehicle is obscured; and
   generating an alarm directed to the driver of the vehicle that includes a notification that the license plate coupled to the vehicle is obscured.

15. The method of claim 13, further comprising causing the control system to:
   determine, based on an image captured from the one or more cameras, that a license plate coupled to the second vehicle is obscured; and
   generating an alarm directed to the driver of the second vehicle that includes a notification that the license plate coupled to the second vehicle is obscured.

16. A tangible, non-transitory computer-readable medium storing instructions that, when executed by a control system in communication with a sensor system, a first gate system, and a second gate system that is subsequent to the first gate system, cause the control system to:
   receive data from the sensor system indicating the presence of a vehicle at a gateway;
   in response to receiving the sensor data indicating the presence of the vehicle, determine whether the second gate system is closed;
   in response to determining that the second gate system is closed:
      open the first gate system to allow the vehicle to pass the first gate system; and
      attempt to close the first gate system behind the vehicle after the vehicle passes the first gate system;
   in response to successfully closing the first gate system behind the vehicle, opening the second gate system to allow the vehicle to proceed through the gateway; and
   in response to unsuccessfully closing the first gate system behind the vehicle, generating an alarm.

17. The tangible, non-transitory computer-readable medium of claim 16, the instructions further causing the control system to:
   receive input from a driver of the vehicle; and
   successfully authenticate the driver, based on the input from the driver, prior to opening the second gate system.

18. The tangible, non-transitory computer-readable medium of claim 17, wherein the input from the driver includes one or more of insertion of a validation ticket, entry of a code, scanning of a barcode, scanning of a radio frequency identification badge, and entry of biometric information.

19. The tangible, non-transitory computer-readable medium of claim 16, wherein generating the alarm includes generating one or more of: a visual alarm, an audio alarm, and an electronic communication.

20. The tangible, non-transitory computer-readable medium of claim 16, wherein the sensor system is adapted to detect an obstacle blocking closure of the first gate system, and the instructions further causing the control system to refrain from closing the first gate system in response to detection of the obstacle by the sensor system.

21. The tangible, non-transitory computer-readable medium of claim 20, wherein the sensor system includes one or more cameras adapted to capture an image of the obstacle blocking the first gate system.

22. The tangible, non-transitory computer-readable medium of claim 21, the instructions further causing the control system to:
   automatically identify the obstacle from the image of the obstacle; and
   generate the alarm based on the identification of the obstacle.

23. The tangible, non-transitory computer-readable medium of claim 22, wherein the obstacle is a second vehicle, and the instructions further causing the control system to:
   automatically identify the second vehicle from the image of the obstacle; and
   based on identifying the second vehicle, generate the alarm to a user of the system to attend to the gateway.

24. The tangible, non-transitory computer-readable medium of claim 23, wherein the obstacle is a second vehicle, and the instructions further causing the control system to:
   automatically identify the second vehicle from the image of the obstacle; and
   based on identifying the second vehicle, generate the alarm to instruct a driver of the second vehicle to back up to allow the first gate system to close.

25. The tangible, non-transitory computer-readable medium of claim 22, wherein the obstacle is a second vehicle, and wherein the one or more cameras are adapted to capture one or more of: an image of a driver of the vehicle, an image of a driver of the second vehicle, an image of a license plate coupled to the vehicle, and an image of a license plate coupled to the second vehicle.

26. The tangible, non-transitory computer-readable medium of claim 25, the instructions further causing the control system to:
   determine, based on an image captured from the one or more cameras, that a license plate coupled to the vehicle is obscured; and
   generating an alarm directed to the driver of the vehicle that includes a notification that the license plate coupled to the vehicle is obscured.

27. The tangible, non-transitory computer-readable medium of claim 26, the instructions further causing the control system to:
   determine, based on an image captured from the one or more cameras, that a license plate coupled to the second vehicle is obscured; and
   generating an alarm directed to the driver of the second vehicle that includes a notification that the license plate coupled to the second vehicle is obscured.

* * * * *